US009527463B2

(12) United States Patent
Ramoutar et al.

(10) Patent No.: US 9,527,463 B2
(45) Date of Patent: Dec. 27, 2016

(54) BUMPER ASSEMBLIES INCLUDING SPACER MEMBERS AND VEHICLES INCORPORATING THE SAME

(71) Applicant: TOYOTA MOTOR ENGINEERING & MANUFACTURING NORTH AMERICA, INC., Erlanger, KY (US)

(72) Inventors: Naipaul Ramoutar, Ann Arbor, MI (US); William F. Graves, Ann Arbor, MI (US); Corinne D. Uskali, Ann Arbor, MI (US); Mark D. Clauser, Saline, MI (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 30 days.

(21) Appl. No.: 14/610,382

(22) Filed: Jan. 30, 2015

(65) Prior Publication Data

US 2016/0152201 A1   Jun. 2, 2016

Related U.S. Application Data

(60) Provisional application No. 62/085,916, filed on Dec. 1, 2014.

(51) Int. Cl.
*B62D 21/15* (2006.01)
*B60R 19/16* (2006.01)
(Continued)

(52) U.S. Cl.
CPC .............. *B60R 19/16* (2013.01); *B60R 19/023* (2013.01); *B60R 19/24* (2013.01); *B62D 21/152* (2013.01)

(58) Field of Classification Search
CPC ....... B62D 21/152; B62D 21/15; B62D 25/08; B62D 25/20; B60R 19/24; B60R 19/34
(Continued)

(56) References Cited

U.S. PATENT DOCUMENTS 6,474,708 B1    11/2002  Gehringhoff et al.
6,866,115 B2 *  3/2005   Miyasaka ............... B60R 19/00
                                                        180/311
(Continued)

FOREIGN PATENT DOCUMENTS

DE         102009035568    *  2/2010   ........... B60R 19/483
DE     WO 2015074753 A1    *  5/2015   ........... B62D 21/152
(Continued)

*Primary Examiner* — H Gutman
(74) *Attorney, Agent, or Firm* — Dinsmore & Shohl LLP (57) ABSTRACT

A bumper beam assembly includes a bumper reinforcement beam that connects to right and left side members of a vehicle at a rear face of the bumper reinforcement beam at a respective bumper beam connecting location and that extend rearward therefrom in a vehicle longitudinal direction. A spacer member is connected to the rear face outboard of the bumper beam connecting location. The spacer member includes a front wall, a rear wall, an inboard wall and an outboard wall, the inboard and outboard walls extend between the front wall and rear wall in the vehicle longitudinal direction. The front wall is connected to the rear face of the bumper reinforcement beam at a connecting portion. The front wall includes a chamfer wall portion outboard of the connecting portion that is separated from the rear face of the bumper reinforcement beam providing a space between the chamfer wall portion and the rear face of the bumper reinforcement beam.

20 Claims, 6 Drawing Sheets

(51) Int. Cl.
*B60R 19/24* (2006.01)
*B60R 19/02* (2006.01)

(58) Field of Classification Search
USPC ...................................................... 296/187.1
See application file for complete search history.

(56) References Cited

U.S. PATENT DOCUMENTS

| | | | |
|---|---|---|---|
| 6,957,846 B2 | 10/2005 | Saeki | |
| 6,994,374 B2 * | 2/2006 | Miyasaka | B60G 7/02 |
| | | | 280/784 |
| 8,210,583 B2 | 7/2012 | Wavde et al. | |
| 8,398,154 B1 | 3/2013 | Nusier | |
| 8,454,080 B2 | 6/2013 | Qu | |
| 8,596,711 B2 | 12/2013 | Yasui | |
| 8,608,231 B1 | 12/2013 | Mendivil | |
| 8,720,961 B2 * | 5/2014 | Han | B60R 19/34 |
| | | | 293/133 |
| 8,733,823 B2 | 5/2014 | Brockhoff et al. | |
| 8,801,083 B2 | 8/2014 | Miyashita | |
| 9,067,617 B2 * | 6/2015 | Konchan | B62D 9/00 |
| 9,073,503 B2 * | 7/2015 | Ookubo | B62D 21/152 |
| 9,180,828 B2 * | 11/2015 | Sakakibara | B60R 19/34 |
| 9,272,679 B1 * | 3/2016 | Ramoutar | B60R 19/14 |
| 9,315,167 B1 * | 4/2016 | Hardy | B60R 19/04 |
| 2013/0256051 A1 | 10/2013 | Nakamura | |
| 2013/0320709 A1 | 12/2013 | Kuwabara | |
| 2014/0062106 A1 * | 3/2014 | Han | B60R 19/34 |
| | | | 293/133 |
| 2014/0062129 A1 | 3/2014 | Syed et al. | |
| 2014/0091585 A1 | 4/2014 | Ramoutar | |
| 2014/0091595 A1 | 4/2014 | Ramoutar | |
| 2014/0159420 A1 | 6/2014 | Hashimoto et al. | |
| 2014/0354008 A1 * | 12/2014 | Sakakibara | B62D 25/082 |
| | | | 296/187.1 |
| 2015/0314742 A1 * | 11/2015 | Kato | B62D 21/152 |
| | | | 293/155 |

FOREIGN PATENT DOCUMENTS

| | | | | |
|---|---|---|---|---|
| JP | 2006103590 A | * | 4/2006 | |
| JP | 2013233820 A | * | 11/2013 | |
| JP | WO 2013172132 A1 | * | 11/2013 | ........... B62D 21/152 |
| JP | WO 2015019167 A1 | * | 2/2015 | ............. B60R 19/24 |
| WO | 2014007403 | | 1/2014 | |

* cited by examiner

BUMPER ASSEMBLIES INCLUDING SPACER MEMBERS AND VEHICLES INCORPORATING THE SAME

CROSS-REFERENCE TO RELATED APPLICATIONS

The present application claims the benefit of and priority to U.S. Provisional Patent Application No. 62/085,916, filed on Dec. 1, 2014 and titled "Bumper Assemblies Including Spacer Members and Vehicles Incorporating the Same," the entire disclosure of which is hereby incorporated by reference.

TECHNICAL FIELD

The present specification generally relates to bumper assemblies and vehicles that include bumper assemblies, and more specifically, bumper assemblies that include spacer members.

BACKGROUND

Vehicles may be equipped with bumper systems and impact protection structures that elastically and plastically deform to absorb energy in the event of an impact.

In one example, a substantial portion of energy from an impact with a small front bumper overlap may be directed outboard of many of the energy absorbing structures of the vehicle. Because a substantial portion of the energy from the impact is directed into the bumper assembly at a position that is outboard of many of the energy absorbing structures of the vehicle, the energy from the impact may not be absorbed or may only be partially absorbed by those energy absorbing structures of the vehicle. The unabsorbed energy may be directed into a front suspension unit and transferred rearward along the vehicle as the front suspension unit contacts vehicle structures proximate to a passenger cabin of the vehicle.

Accordingly, a need exists for alternative structures for transferring energy and absorbing energy from an impact with a small overlap to the front bumper.

SUMMARY

In one embodiment, a bumper beam assembly includes a bumper reinforcement beam that connects to right and left side members of a vehicle at a rear face of the bumper reinforcement beam at a respective bumper beam connecting location and that extend rearward therefrom in a vehicle longitudinal direction. A spacer member is connected to the rear face outboard of the bumper beam connecting location. The spacer member includes a front wall, a rear wall, an inboard wall and an outboard wall, the inboard and outboard walls extend between the front wall and rear wall in the vehicle longitudinal direction. The front wall is connected to the rear face of the bumper reinforcement beam at a connecting portion. The front wall includes a chamfer wall portion outboard of the connecting portion that is separated from the rear face of the bumper reinforcement beam providing a space between the chamfer wall portion and the rear face of the bumper reinforcement beam.

In another embodiment, a vehicle includes a side member that extends in a vehicle longitudinal direction. A bumper reinforcement beam is connected to the side member at a rear face of the bumper reinforcement beam. A spacer member is connected to the rear face outboard of the side member. The spacer member includes a front wall, a rear wall, an inboard wall and an outboard wall. The inboard and outboard walls extend between the front wall and rear wall in the vehicle longitudinal direction. The front wall is connected to the rear face of the bumper reinforcement beam at a connecting portion. The front wall includes a chamfer wall portion that is separated from the rear face of the bumper reinforcement beam providing a space between the chamfer wall portion and the rear face of the bumper reinforcement beam.

In another embodiment, a method of providing a vehicle bumper assembly is provided. The method includes connecting a bumper reinforcement beam to a side member of a vehicle at a rear face of the bumper reinforcement beam. A spacer member is connected to the rear face outboard of the side member. The spacer member includes a front wall, a rear wall, an inboard wall and an outboard wall. The inboard and outboard walls extend between the front wall and rear wall in a vehicle longitudinal direction. The front wall is connected to the rear face of the bumper reinforcement beam at a connecting portion. The front wall includes a chamfer wall portion that is separated from the rear face of the bumper reinforcement beam providing a space between the chamfer wall portion and the rear face of the bumper reinforcement beam.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include a bumper beam assembly, where the bumper beam assembly includes a bumper reinforcement beam connected to longitudinally extending left and right side members. The bumper reinforcement beam extends generally in a vehicle lateral direction and a front face of the bumper reinforcement beam is oriented to face forward in the vehicle longitudinal direction. In some embodiments, reinforcement brackets may be coupled to the front face of the bumper beam assembly at outboard portions of the bumper reinforcement beam. As will be described herein, spacer members may be provided at a rear face of the bumper reinforcement beam. The spacer members may be provided at the outboard portions of the bumper reinforcement beam to interact with the left and right side members during a small front bumper overlap impact by directing reaction forces longitudinally in the vehicle widthwise direction. Catcher structures may also be provided at the left and right side members. The catcher structures may be located rearward of the spacer members such that longitudinal movement is further impeded and reaction forces are further directed longitudinally in the vehicle longitudinal direction.

Figure 1:
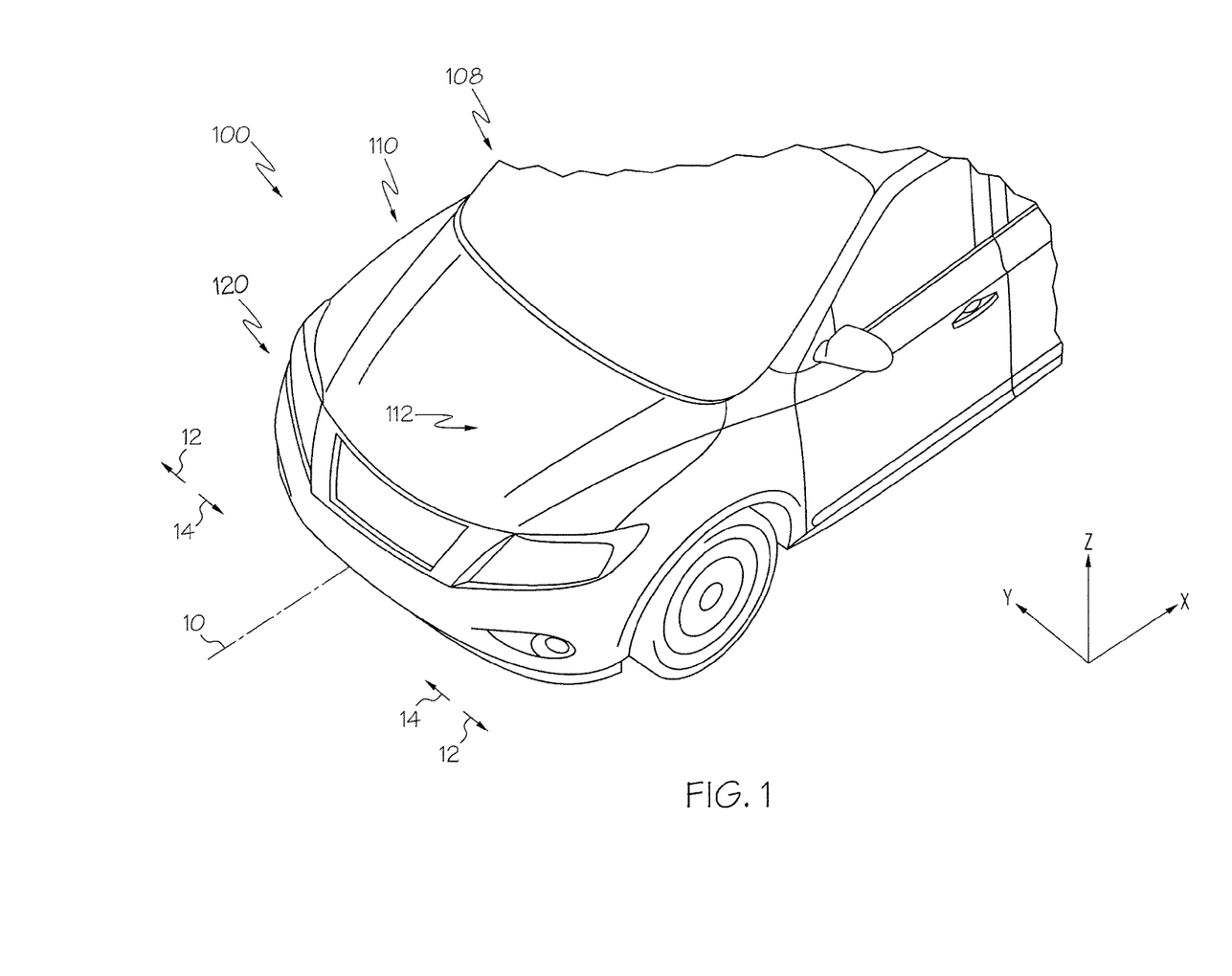
FIG. 1 schematically depicts a perspective view of a vehicle according to one or more embodiments shown or described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard" and "outboard" are used to describe the relative positioning of various components of the vehicle. Referring to FIG. 1, the term "outboard" as used herein refers to the relative location of a component in direction 12 with respect to a vehicle centerline 10. The term "inboard" as used herein refers to the relative location of a component in direction 14 with respect to the vehicle centerline 10. Because the vehicle structures may be generally symmetrical about the vehicle centerline 10, the direction to which use of terms "inboard" and "outboard" refer may be mirrored about the vehicle centerline 10 when evaluating components positioned along opposite sides of the vehicle 100.

Motor vehicles that incorporate elements according to the present disclosure may include a variety of construction methodologies that are conventionally known, including the unibody construction methodology depicted in FIG. 1 as well as a body-on-frame construction methodology. While the embodiments of the present disclosure are described and depicted herein in reference to unibody structures, it should be understood that vehicles that are constructed with body-on-frame construction may incorporate the elements that are shown and described herein. Furthermore, the Figures may only show on side of the vehicle. Descriptions of the other side of the vehicle may be omitted because both sides of the vehicle may be laterally symmetrical and substantially the same.

Referring initially to FIG. 1, a vehicle 100 is depicted. The vehicle 100 includes a unibody 110 onto which a vehicle drivetrain is coupled. The vehicle 100 also includes a cabin 108 that is integral with the unibody 110 and an engine bay 112 where a power unit (e.g., engine and transmission) is located. The cabin 108 generally defines a passenger cabin of the vehicle 100. The vehicle 100 includes a bumper assembly 120 that is positioned at the front of the vehicle 100.

Figure 2:
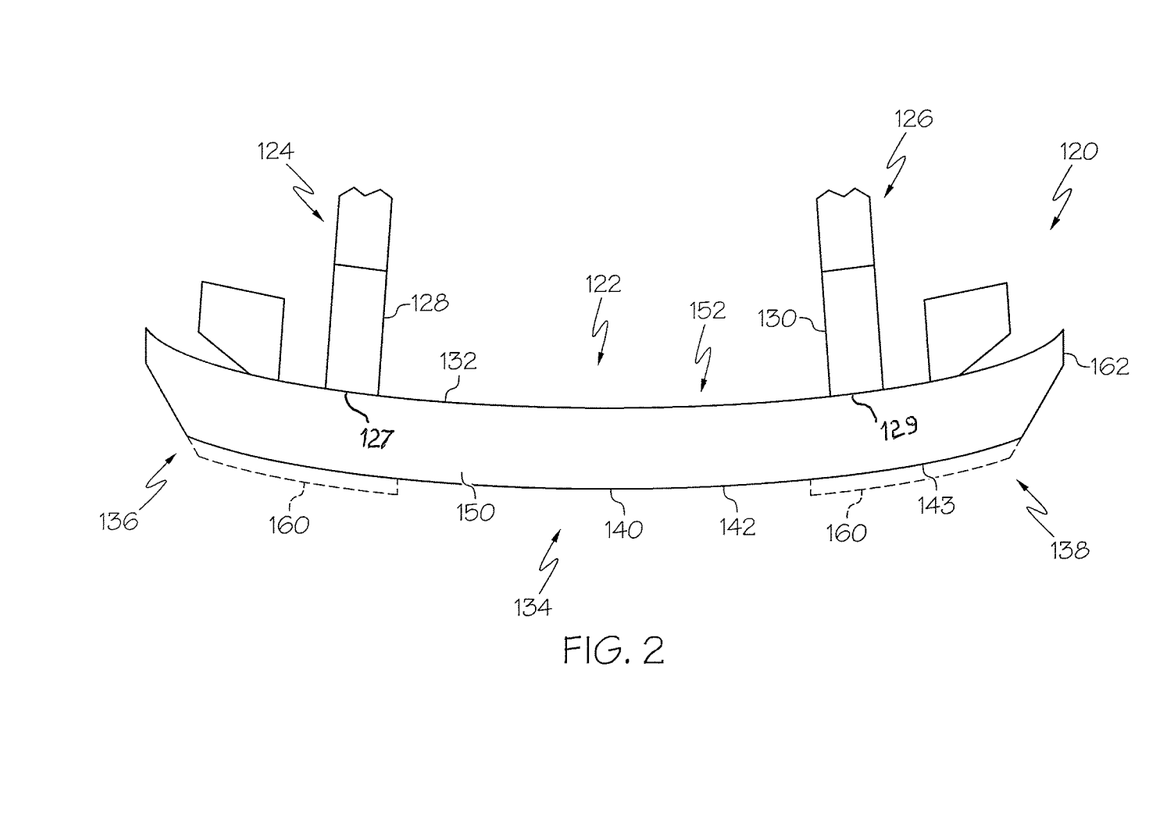
FIG. 2 schematically depicts a top view of a bumper assembly including spacer member according to one or more embodiments shown or described herein.

Referring to FIG. 2, the bumper assembly 120 is illustrated and includes a bumper reinforcement beam 122 that extends generally in the vehicle lateral direction. The bumper reinforcement beam 122 is supported by front side members 124 and 126 at bumper beam connecting locations 127 and 129 that are spaced-apart widthwise in the vehicle lateral direction. The front side members 124 and 126 may include crush boxes 128 and 130 that are connected to a rear face 132 of the bumper reinforcement beam 122.

The bumper reinforcement beam 122 may have a central portion 134 and extension portions 136 and 138. The extension portions 136 and 138 may extend outwardly beyond the side members 124 and 126, respectfully, in the vehicle lateral direction. The central portion 134 may be located between the side members 124 and 126. The extension portions 136 and 138 may be integral with the central portion 134, or the central portions 136 and 138 may be separately attached to the central portion 134 forming the bumper reinforcement beam 122. The bumper reinforcement beam 122 may have a generally curved shape, as depicted in FIG. 2. More specifically, an inboard position 140 on a front face 142 of the bumper reinforcement beam 122 may be positioned forward of an outboard position 143 on the front face 142 of the bumper reinforcement beam 122 in the vehicle longitudinal direction, thereby giving the bumper reinforcement beam 122 a generally curved shape. In other embodiments, the bumper reinforcement beam 122 may have a generally straight shape extending in the vehicle lateral direction. The bumper reinforcement beam 122 may alternatively have any suitable shape that extends in the vehicle lateral direction.

The bumper reinforcement beam 122 including the bumper extension portions 136 and 138 include the front face 142 that is oriented to face forward in the vehicle longitudinal direction. The front face 142 of the bumper reinforcement beam 122 may be a generally planar surface that extends in the vehicle lateral direction. In other embodiments, the front face 142 of the bumper reinforcement beam 122 may include a contoured surface that extends in the vehicle lateral direction. The bumper reinforcement beam 122 further includes a top side 150 and a bottom side 152 that is positioned opposite the top side 150. The top side 150 and the bottom side 152 of the bumper reinforcement beam 122 may be oriented transverse to the front face 142, extending rearwardly from the front face 142.

As represented by the dashed lines, the bumper reinforcement beam 122 may have a reinforcement bracket 160 coupled thereto at an outboard end 162 of the bumper reinforcement beam 122. The reinforcement bracket 160 may be formed from a variety of materials including, for example and without limitation, metals, composites, and the like, and may be formed by any suitable method or combination of methods such as stamping, forging, machining, and the like. The reinforcement bracket 160 may be coupled to the front face 142 of the bumper reinforcement beam 122. In the depicted embodiment, the reinforcement bracket 160 may be coupled to the front face 142 of the bumper extension portions 136 and 138. In some embodiments, the reinforcement bracket 160 may be coupled to the front face 142 of the bumper reinforcement beam 122. The reinforcement bracket 160 may span between the bumper extension portions 136 and 138 and the central portion 134.

Figure 3:
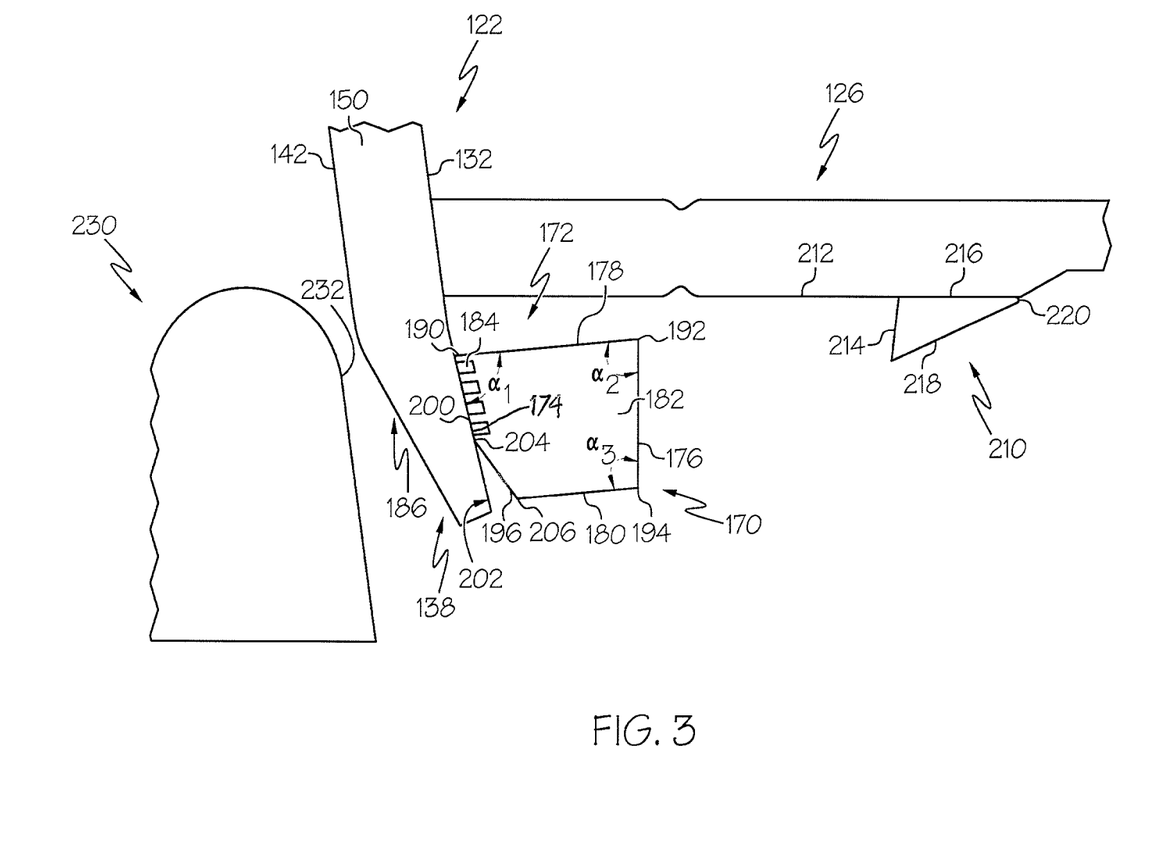
FIG. 3 schematically depicts a more detailed view of the bumper assembly and spacer member shown in FIG. 2.

Referring to FIG. 3, the bumper reinforcement beam 122 including the bumper extension portion 138 includes the rear face 132 that is positioned opposite of the front face 142. The rear face 132 of the bumper reinforcement beam 122 is generally transverse to the top side 150 and the bottom side 152 of the bumper reinforcement beam 122 and the rear face 132 is oriented to face rearward in the vehicle longitudinal direction. A spacer member 170 is coupled to the rear face 132 of the bumper reinforcement beam 122 at a position that is outboard of the side member 126. In embodiments, the spacer member 170 may be coupled to the rear face 132 of the bumper extension portion 138 at a position that is outboard of and spaced from the side member 126 leaving a gap 172 therebetween.

The spacer member 170 is illustrated as a somewhat box-shaped member that includes a front wall 174 and a rear wall 176. The front and rear walls 174 and 176 may be connected together by an inboard wall 178 and an outboard wall 180. The walls 174, 176, 178 and 180 may further be connected together by top and bottom walls 182 forming a closed box structure. In other embodiments, top and bottom walls may not be provided, thereby forming an open structure. The walls 174, 176, 178, 180 and 182 may all be connected together by any suitable process or combination of processes, such as welding, brazing, fastening, etc. The walls 174, 176, 178, 180 and 182 may also be formed of any suitable materials, such as metals, and by any suitable process or combination of processes such as machining, bending, stamping, etc. Further, while the walls 174, 176, 178, 180 and 182 may each be formed of separate sheets, the two or more of the walls 174, 176, 178, 180 and 182 may be formed of a single, bent sheet. Further, a single wall 174, 176, 178, 180 and 182 may be formed of separate sheets connected together of a sheet forming at least a portion of multiple, adjacent walls 174, 176, 178, 180 and 182.

The front wall 174 is connected to the rear face 132 of the bumper reinforcement beam 122 at the bumper extension portion 138. The front wall 174 may be connected to the rear face 132 of the bumper reinforcement beam 122 by any suitable process or combination of processes, such as welding, brazing, fastening, etc. In the illustrated embodiment, the front wall 174 is connected to the rear face 132 of the bumper reinforcement beam 122 by fasteners 184 that are accessible through an opening 186 in the front face 142 of the bumper reinforcement beam 122.

Figure 4A:
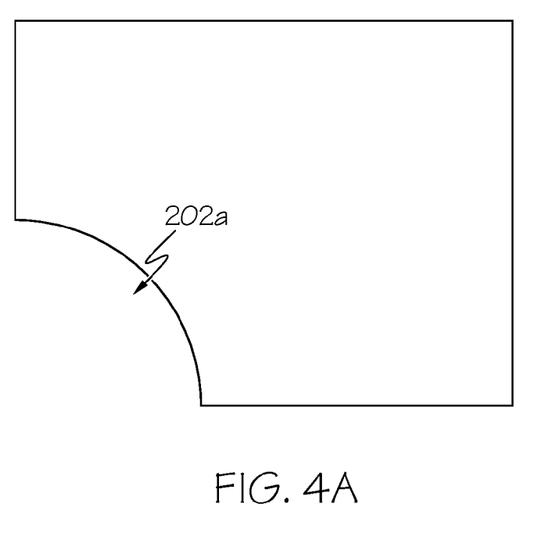
FIG. 4A illustrates another exemplary embodiment of a spacer member for use with the bumper assembly of FIG. 3.
Figure 4B:
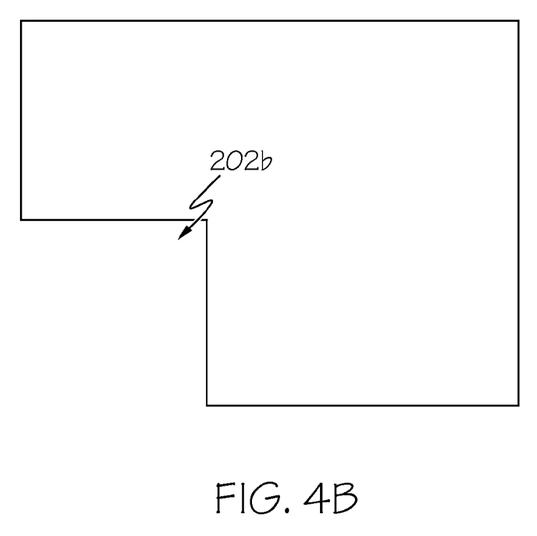
FIG. 4B illustrates another exemplary embodiment of a spacer member for use with the bumper assembly of FIG. 3.

As can be seen, the front wall 174 and inboard wall 178 are connected at a corner 190 forming an angle $\alpha_1$ therebetween. The inboard wall 178 is connected to the rear wall 176 at a corner 192 forming an angle $\alpha_2$ therebetween. The rear wall 176 is connected to the outboard wall 180 at another corner 194 forming an angle $\alpha_3$ therebetween. The angles $\alpha_1$, $\alpha_2$ and $\alpha_3$ may all be substantially the same, or they may be different. The front wall 174 is connected to the outboard wall 180 by a chamfer wall portion 196. The chamfer wall portion 196 cuts through an imaginary apex formed between the front wall 174 and the outboard wall 180. Generally, the front wall 174 shares a boundary with the rear face 132 of the bumper reinforcement beam 122 at a connecting portion 200 of the front wall 174. The chamfer wall portion 196 extends rearward in the vehicle longitudinal direction at an angle to the connecting portion 200 of the front wall 174, thereby providing a space 202 between the chamfer wall portion 196 and the rear face 132 of the bumper reinforcement beam 122. As can be seen, the space 202 increases in width from an inboard end 204 to an outboard end 206 forming a somewhat triangular shape; however, other shapes are possible as shown by FIGS. 4A and 4B. For example, FIG. 4A illustrates a somewhat rounded space 202a and FIG. 4B illustrates a rectangular shaped space 202b. Other shapes are possible, such as irregular shapes. The chamfer wall portion 196 reduces a contact area between the front wall 174 and the rear face 132 of the bumper reinforcement beam 122 during normal operation and facilitates some relative rotation between the bumper extension portion 138 and the spacer member 170 during a small overlap impact, as will be described in greater detail below.

A catcher member 210 may be coupled to the side member 126. The catcher member 210 may be coupled to the side member 126 to an outboard side 212 of the side member 126 at a location that is spaced from and rearward of the spacer member 170 in the vehicle longitudinal direction, but aligned with the spacer member 170 in the vehicle vertical direction. The catcher member 210 includes a front wall 214 and a pair of side walls 216 and 218. In the illustrated embodiment, the side walls 216 and 218 are joined together at a point 220 thereby forming a somewhat triangular shape. In other embodiments, the side walls 216 and 218 may be joined by a rear wall forming a somewhat box-like shape. In some embodiments, the catcher member 210 may include top and bottom walls. The side wall 216 is connected to the outboard side 212 of the side member 126. Any suitable process may be used to connect the catcher member 210 to the side member 126, such as welding, brazing, fastening, etc. During ordinary vehicle operation, the spacer member 170 may be detached and spaced from the catcher member 210 in the vehicle longitudinal direction. The spacer member 170 and the catcher member 210 may assist transferring energy associated with an impact from the bumper reinforcement beam 122 to the side member 126 during a small front bumper overlap impact.

When a vehicle impacts a barrier, vehicle structures may elastically and plastically deform to absorb energy while slowing the vehicle from its previous operating speed. The vehicle structures divert and absorb the energy associated with the moving vehicle into energy that deforms the vehicle structures. The vehicle structures may be designed to accommodate the introduction of the energy of the impact, such that the energy associated with the impact may be controllably dissipated and directed through selective and preferential deformation of the vehicle structures.

The front corner of the vehicle may impact an object in what is referred to herein as a small front bumper overlap or a small overlap impact. In a small front bumper overlap impact, the impact occurs at an outboard portion of the vehicle (evaluated in a vehicle lateral direction), and only a portion of the front bumper strikes the object. In some small front bumper overlap impacts, no more than about 25% of the front bumper strikes the object. In such impacts, some of the energy dissipation elements of the vehicle may not be initiated or may be only partially initiated. In such impacts, the energy that is introduced to the vehicle structures may be non-symmetrical when evaluated in the vehicle lateral direction. Accordingly, the reaction of the vehicle structures to the energy introduced by the small overlap impacts may introduce a non-symmetrical response to the vehicle structures. Referring to embodiments disclosed herein, the structural members of the unibody 110 for example, may be non-symmetrically loaded when the vehicle is involved in a small overlap impact.

When a vehicle strikes an object with a front corner of the vehicle, the structures of the vehicle plastically and elastically deform to absorb the energy of the impact. Because only a portion of the front bumper strikes an object during a small front bumper overlap impact, all of the energy absorbing structures associated with the front bumper may have a reduced effect on the dissipation of energy of the impact. In particular, some of the energy absorbing structures associated with the front bumper of the vehicle may not be activated or may be only partially activated, such that a portion of the energy absorbing structure of the vehicle may not dissipate energy associated with the small front bumper overlap impact. Instead, the energy from the impact may be directed into the front suspension unit of the vehicle proximate to the barrier that the vehicle impacts.

FIG. 3 illustrates the bumper assembly 120 prior to a small front bumper overlap impact with a barrier, for example, during a small front bumper overlap impact test. During normal operation prior to a small front bumper overlap impact, the bumper assembly 120 may have a deactivated configuration where the spacer member 170 is detached and spaced-apart from both the side member 126 in the vehicle lateral direction and the catcher member 210 in the vehicle longitudinal direction. In this deactivated configuration, the chamfer wall portion 196 extends rearward in the vehicle longitudinal direction leaving the space 202 between the chamfer wall portion 196 and the rear face 132 of the bumper reinforcement beam 122.

In small front bumper overlap tests, the vehicle 100 may impact a barrier 230 (or vice versa) that has a vehicle-facing surface 232. The vehicle-facing surface 232 of the barrier 230 may extend in a direction that is transverse to the vehicle longitudinal direction. Accordingly, in such impact configurations, the bumper reinforcement beam 122 extends generally in the same direction as the vehicle-facing surface 232 of the barrier 230. In some impact configurations, such as the small front bumper overlap impact depicted in FIG. 3, the bumper extension portion 138 of the bumper reinforcement beam 122 may at least partially overlap the vehicle-facing surface 232 of the barrier 230 in the vehicle lateral direction.

The vehicle-facing surface 232 of the barrier 230 may impact the bumper extension portion 138 of the bumper reinforcement beam 122. Because the bumper extension portion 138 overlaps the vehicle-facing surface 232 of the barrier 230, the impact between the vehicle-facing surface 232 of the barrier 230 and the bumper reinforcement beam 122 may be directed into the bumper extension portion 138. Because the bumper extension portion 138 of the bumper reinforcement beam 122 may direct a portion of the energy associated with the impact rearward in the vehicle longitudinal direction (particularly in embodiments where a reinforcement bracket), the bumper reinforcement beam 122 may deform and translate rearward in the vehicle longitudinal direction.

As described above, the bumper reinforcement beam 122 is coupled to the side member 126. Because the bumper reinforcement beam 122 may initially deform and translate primarily rearward in the vehicle longitudinal direction, the bumper reinforcement beam 122 may direct energy into the side member 126 such that the energy is directed rearward in the vehicle longitudinal direction. Because the energy associated with the impact is initially directed rearward in the vehicle longitudinal direction, the side member 126 may remain near its original longitudinal orientation as opposed to rotating inboard or outboard and away from the impact. As the energy associated with the impact causes the side member 126 to plastically and elastically deform, the side member 126 may continue to absorb energy. By absorbing energy associated with the impact, the side member 126 may reduce the amount of energy that is directed rearward toward the passenger cabin of the vehicle 100. Accordingly, by directing energy associated with the impact rearward in the vehicle longitudinal direction, the side member 126 may reduce the amount of energy associated with the impact that is directed into the passenger cabin of the vehicle 100.

Figure 5:
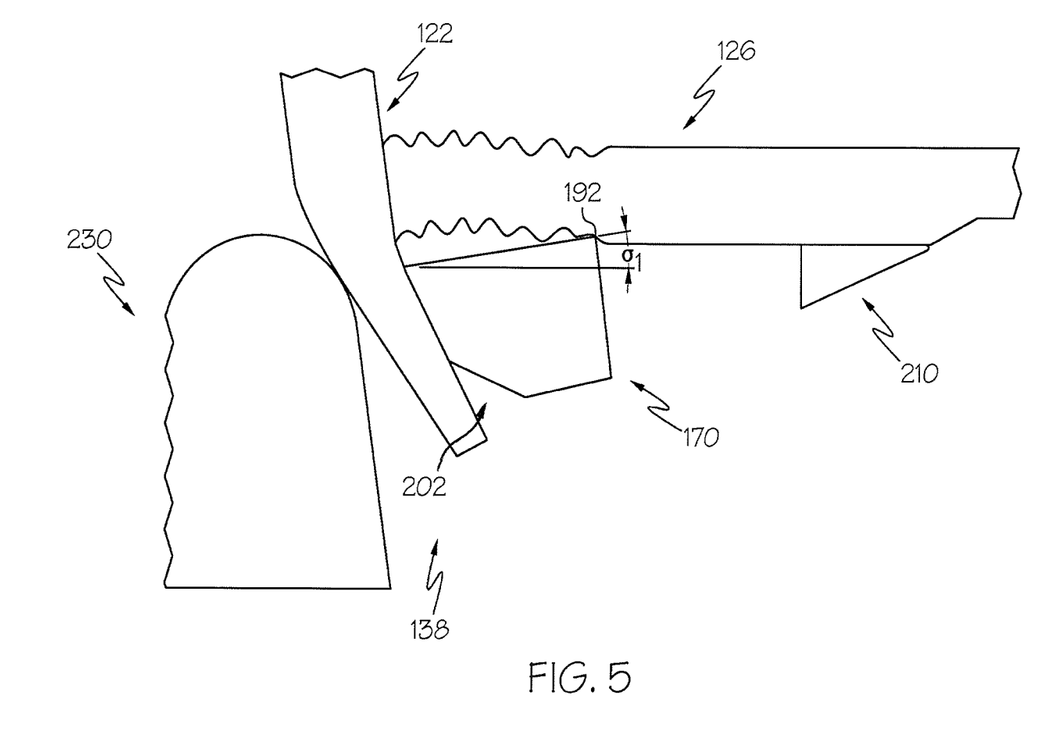
FIG. 5 schematically depicts a top view of the bumper assembly of FIG. 3 in operation according to one or more embodiments shown or described herein.

Referring to FIG. 5, as the bumper reinforcement beam 122 plastically and elastically deforms and moves rearward in the vehicle longitudinal direction, energy associated with the impact may reposition the bumper extension portion 138 of the bumper reinforcement beam 122 from the deactivated configuration into an activated configuration. Specifically, as the bumper extension portion 138 of the bumper reinforcement beam 122 translates rearward, the extension portion 138 may also rotate inboard in bending (e.g., at a location near the side member 126) in the vehicle lateral direction. Because the space 202 is provided, rotation of the spacer member 170 at corner 192 may be reduced initially (e.g., at up to 200 mm from initial contact with the barrier 230) to an angle $\sigma_1$. Contact between the spacer member 170 and the side member 126 can decrease reaction forces between the barrier 230 and the vehicle 100.

Figure 6:
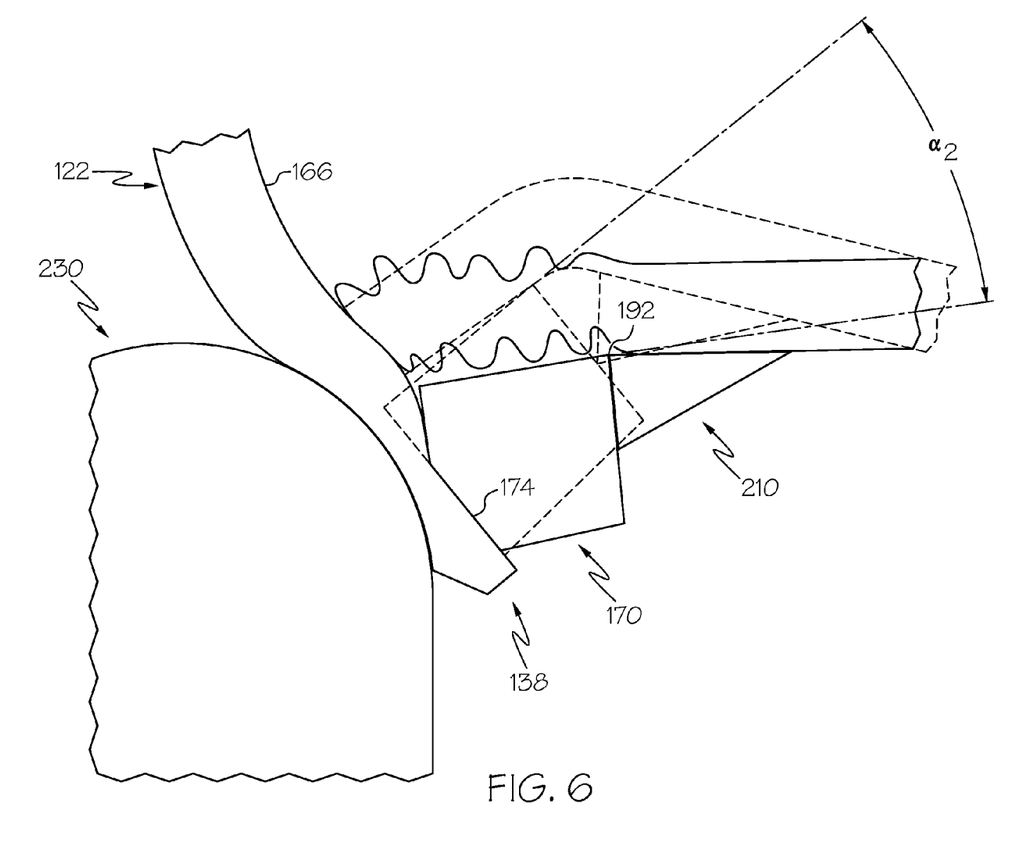
FIG. 6 schematically depicts another top view of the bumper assembly of FIG. 3 in operation according to one or more embodiments shown or described herein.

Referring to FIG. 6, further movement of the bumper extension portion 138 and the spacer member 170 rearward in the vehicle longitudinal direction can bring the spacer member 170 into engagement with the catcher member 210 that is coupled to the side member 126. The catcher member 210 can provide a barrier that inhibits rearward movement of the spacer member 170 in the vehicle longitudinal direction. The bumper extension portion 138 of the bumper reinforcement beam 122 may also close the space 202 between the bumper reinforcement beam 122 and the spacer member 170. Closing the space 202 can increase an area of contact between the front wall 174 of the spacer member 170 and the rear face 132 of the bumper reinforcement beam 122. Providing the chamfer wall portion 196 can direct impact forces more longitudinally, which can result in a more axial crush of the side member 126.

In some embodiments, however, by increasing the contact between the front wall 174 and the rear face 132 of the bumper reinforcement beam 122 and inhibiting further rearward movement of the spacer member 170, increased rotation of the spacer member 170 at the corner 192 and a greater angle $\alpha_2$ can be achieved, if desired (illustrated by dashed lines). Such an arrangement can be used to transmit reaction forces received from the barrier 230 due to the small front bumper overlap impact toward a non-impact side to effectively generate lateral force toward the engine bay, which can also move the vehicle cabin away from the barrier 230. However, in other embodiments, a more longitudinal reaction force may be desired, as illustrated by the solid lines.

The above-described bumper assemblies with spacer members include spacer members having front-facing walls with reduced contact with a rear face of the bumper reinforcement beam. In other words, a contact width of the front-facing wall of the spacer members in contact with the rear face of the bumper reinforcement beam is less than a maximum width of the front wall of the spacer members. This is due to a chamfer wall portion of the front wall that extends rearward from a connecting portion of the front wall of the spacer member thereby providing a space between the front wall and the rear face of the bumper reinforcement beam. Such an arrangement can allow for some relative rotation between a bumper extension portion of the bumper reinforcement beam and the spacer member during a small front bumper overlap impact. Such an arrangement can also facilitate rearward movement of the spacer member along a side member of the vehicle toward a catcher member fixed to the side member.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A bumper beam assembly comprising:
   a bumper reinforcement beam that connects to right and left side members of a vehicle at a rear face of the bumper reinforcement beam at a respective bumper beam connecting location and that extend rearward therefrom in a vehicle longitudinal direction; and
   a spacer member connected to the rear face outboard of the bumper beam connecting location, the spacer member comprising a front wall, a rear wall, an inboard wall and an outboard wall, the inboard and outboard walls extend between the front wall and rear wall in a vehicle longitudinal direction;
   wherein the front wall is connected to the rear face of the bumper reinforcement beam at a connecting portion, the front wall including a chamfer wall portion outboard of the connecting portion that is separated from the rear face of the bumper reinforcement beam providing a space between the chamfer wall portion and the rear face of the bumper reinforcement beam, the chamfer wall portion terminating inboard of an outboard end of the bumper reinforcement beam.

2. The bumper beam assembly of claim 1, wherein the chamfer wall portion extends away from the rear face of the bumper reinforcement beam from the connecting portion of the front wall of the spacer member.

3. The bumper beam assembly of claim 1, wherein the connecting portion of the front wall of the spacer member shares a boundary with the rear face of the bumper reinforcement beam.

4. The bumper beam assembly of claim 1, wherein the space between the chamfer wall portion and the rear face of the bumper reinforcement beam increases in width from an inboard end of the space to an outboard end of the space.

5. The bumper beam assembly of claim 1, wherein at least about 20 percent of a width of the front wall measured between the inboard and outboard walls of the spacer member is spaced from the rear wall of the bumper reinforcement beam.

6. The bumper beam assembly of claim 1, wherein the front wall of the spacer member is connected to an extension portion of the bumper reinforcement beam.

7. A vehicle comprising:
   a side member that extends in a vehicle longitudinal direction;
   a bumper reinforcement beam connected to the side member at a rear face of the bumper reinforcement beam; and
   a spacer member connected to the rear face outboard of the side member, the spacer member comprising a front wall, a rear wall, an inboard wall and an outboard wall, the inboard and outboard walls extend between the front wall and rear wall in the vehicle longitudinal direction;
   wherein the front wall is connected to the rear face of the bumper reinforcement beam at a connecting portion, the front wall including a chamfer wall portion that is separated from the rear face of the bumper reinforcement beam providing a space between the chamfer wall portion and the rear face of the bumper reinforcement beam, the chamfer wall portion terminating inboard of an outboard end of the bumper reinforcement beam.

8. The vehicle of claim 7, wherein the chamfer wall portion extends away from the rear face of the bumper reinforcement beam from the connecting portion of the front wall of the spacer member.

9. The vehicle of claim 7, wherein the connecting portion of the front wall of the spacer member shares a boundary with the rear face of the bumper reinforcement beam.

10. The vehicle of claim 7, wherein the space between the chamfer wall portion and the rear face of the bumper reinforcement beam increases in width from an inboard end of the space to an outboard end of the space.

11. The vehicle of claim 7, wherein at least about 20 percent of a width of the front wall measured between the inboard and outboard walls of the spacer member is spaced from the rear wall of the bumper reinforcement beam.

12. The vehicle of claim 7, wherein the front wall of the spacer member is connected to an extension portion of the bumper reinforcement beam.

13. The vehicle of claim 7 further comprising a catcher member that is coupled to the side member and positioned rearward of the spacer member in the vehicle longitudinal direction.

14. The vehicle of claim 13, wherein the spacer member is repositionable between a deactivated configuration and an activated configuration, wherein the spacer member is detached and spaced apart from the catcher member in the vehicle longitudinal direction in the deactivated configuration, and the spacer member is in contact with the catcher member in the activated configuration.

15. The vehicle of claim 14, wherein the spacer member is spaced apart from the side member in a vehicle lateral direction in the deactivated configuration.

16. The vehicle of claim 15, wherein the spacer member engages the side member in the activated configuration and the space is reduced between the chamfer wall portion and the rear face of the bumper reinforcement beam.

17. A method of providing a vehicle bumper assembly, the method comprising:
   connecting a bumper reinforcement beam to a side member of a vehicle at a rear face of the bumper reinforcement beam; and
   connecting a spacer member to the rear face outboard of the side member, the spacer member comprising a front wall, a rear wall, an inboard wall and an outboard wall, the inboard and outboard walls extend between the front wall and rear wall in a vehicle longitudinal direction;
   wherein the front wall is connected to the rear face of the bumper reinforcement beam at a connecting portion, the front wall including a chamfer wall portion that is separated from the rear face of the bumper reinforcement beam providing a space between the chamfer wall portion and the rear face of the bumper reinforcement beam, the chamfer wall portion terminating inboard of an outboard end of the bumper reinforcement beam.

18. The method of claim 17 further comprising coupling a catcher member to the side member rearward of the spacer member in the vehicle longitudinal direction.

19. The method of claim 18, wherein the spacer member is repositionable between a deactivated configuration and an activated configuration, wherein the spacer member is detached and spaced apart from the catcher member in the vehicle longitudinal direction in the deactivated configuration, and the spacer member is in contact with the catcher member in the activated configuration.

20. The method of claim 19, wherein the spacer member is spaced apart from the side member in a vehicle lateral direction in the deactivated configuration.

* * * * *